Sept. 28, 1965  G. A. ZIPPEL  3,208,457
SUSPENSION FITTING FOR FILING CONTAINERS
Filed Jan. 27, 1964  2 Sheets-Sheet 1

INVENTOR.
GEORG ALFRED ZIPPEL
BY
*Woodhams, Blanchard & Flynn*
ATTORNEYS

INVENTOR.
GEORG ALFRED ZIPPEL 3,208,457
SUSPENSION FITTING FOR FILING
CONTAINERS
Georg Alfred Zippel, Altdorf, near Nurnberg, Germany
Filed Jan. 27, 1964, Ser. No. 340,227
Claims priority, application Germany, Jan. 28, 1963,
Z 9,879
2 Claims. (Cl. 129—16.7)

This invention relates to a suspension fitting for filing containers, such as suspension folders, suspension envelopes, etc., for use in suspension filing arrangements, such as shelves or cabinets. The fitting is integral with or is mounted on the suspension edge of the filing container. The fitting has a recess which is open at the top and which has two noses extending toward each other at the top thereof. The space between the noses, and, thus, the size of the opening in the suspension edge, is less than the width of the suspension track. The width of the recess below the noses is sufficiently greater than the width of the suspension track that the filing container can be moved and turned transversely with respect to the suspension track for the purpose of placing the filing container on or removing it from the track.

A device of this kind, as disclosed in German Patent No. 969,099, provides both a completely secure suspension of the filing containers on the suspension track and a simple mounting and removal procedure. However, the filing container must be put in an inclined position when it is being mounted on or removed from the track. The amount of inclination necessary for this purpose will determine the open space that must be provided in the cabinet above, below and behind the filing container. This space will be unproductive and consequently must be made as small as possible. Otherwise in filing systems with a number of suspension tracks located above each other, or in the case of large-size filing containers, this unproductive space will become very substantial.

The present invention is concerned with the problem of constructing a suspension fitting which has the advantages referred to above and yet which requires a minimum of unproductive space in the filing shelves or cabinets.

In order to solve this problem, the invention starts from a suspension fitting as described above and modifies it in such a manner that the mutually adjacent end edges of the two noses are inclined in approximately the same direction with respect to the suspension edge of the filing container. The end edge of the nose adjacent the access side of the filing shelf or cabinet forms an acute angle with the suspension edge of the filing container. This has the unexpected effect, that for the purpose of placing the filing container on or removing it from the suspension track, the filing container need be inclined only slightly so that the open space needed between the filing containers and the floor or the ceiling and the back wall of the filing cabinet, and the distance between the filing containers arranged above each other, can be reduced by more than half. This is of great advantage because it permits a reduction in the size of the filing cabinets, or alternatively a greater number of suspension tracks can be installed in a cabinet of given size.

It would also be advantageous to reduce the width, that is, the distance between the upper and lower edges, of the noses which extend over the recess. This, however, is difficult because of high strength requirements. The invention has resulted in the discovery, however, that the width of the noses in suspension fittings made of metal or plastic reaches an optimum value when it amounts to about 4 millimeters. This provides adequate bending rigidity for suspension files and, in addition, the above described open space is still further significantly reduced.

The above-described known suspension arrangement utilizes a suspension track whose cross-sectional shape is that of an inverted T. In the known arrangement the height of the stem of the T is considerable so that the suspension track has sufficient bending strength. If now in a suspension file system with suspension tracks arranged above each other and using the suspension fitting of the present invention, the distance between adjacent suspension tracks is considerably reduced, then the distance from the upper edge of the stem of the lower suspension track to the lower edge of the next higher track is no longer sufficient to attach or remove the suspension file. According to the invention, however, this defect can be eliminated by having the ratio of the height of the stem of the T to the length of the cross bar of the T be smaller than 0.5. In order to maintain adequate bending resistance of the suspension track the latter can be double-T-shaped in cross section, that is, it can have a second cross bar at its upper end. If necessary, it is also possible to form the second cross bar thicker than the other parts of the double-T-profile.

The invention is diagrammatically illustrated by way of example in the accompanying drawings, in which.

Figure 1:
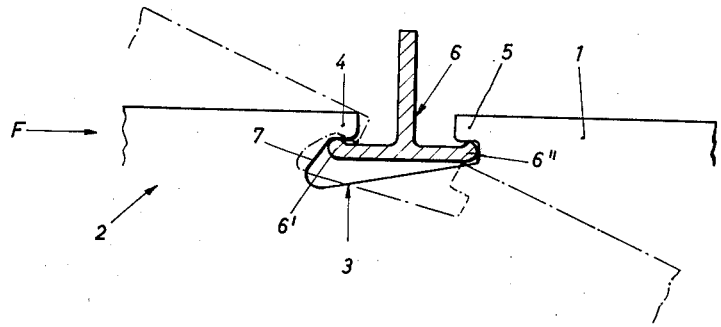
FIGURE 1 shows a fragment of a known suspension fitting in a front elevational view mounted on a suspension track which is shown in cross section.
Figure 5:
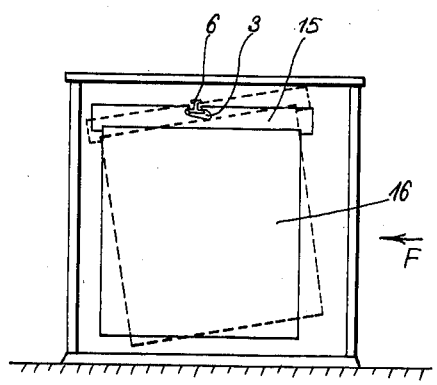
FIGURE 5 is a front view of a filing cabinet with a suspension track for suspending large-size drawings.
Figure 6:
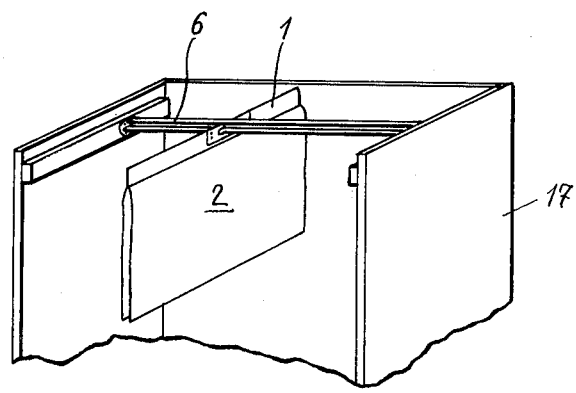
FIGURE 6 shows in perspective the upper part of a filing cabinet with the top wall removed.

A fragment of a known suspension fitting is shown in FIGURE 1. The fitting here is formed in the suspension edge 1 of a suspension file 2. It will be apparent, however, that the fitting can be a separate piece attached to the suspension edge as shown by FIGURES 5 and 6. The fitting has a recess 3 which opens through the suspension edge. Two noses 4 and 5 extend toward each other from the opposite side edges of the recess 3. The distance between the free end of nose 4 and the free end of nose 5, i.e., the width of the open side of recess 3, is smaller than the width of the suspension track 6 which is received in the recess. On the access side, that is the side which the user ordinarily will grasp in order to remove the file 2 from the track (the rightward side in FIGURES 1–3), the recess 3 is enlarged so that the file, because of the clearance in the recess 3 transversely to track 6, can be moved and turned with respect to said track. In order to remove the file 2 from the track 6, the file 2 is moved in the direction of the arrow F. This causes a tilting of the file 6 to take place, because during the shifting suspension edge 6' slides on inclined surface 7 of the recess 3. Because of these tilting and pushing movements of the file 2, nose 5 slides off the suspension edge 6" of track 6, then the file 2 while in its tilted position may be removed from track 6 by a movement in a direction opposite to the direction indicated by arrow F. However, it is also possible to let file 2 hang in the slanted position as indicated in broken lines in FIGURE 1, with the nose 4 of the suspension fitting being supported on the edge 6' of the suspension track, while nose 5 presses upwardly from underneath against edge 6" of the suspension track, after the center of gravity of the file 2 because of the slanted position has shifted so far sidewardly that it is no longer vertically under the support of nose 4. As the broken line position of the file 2 in FIGURE 1 shows, it is necessary in the case of known suspension fittings of this type to place the file 2 into a position where it is considerably slanted when it is to be removed from suspension track 6.

Figure 2:
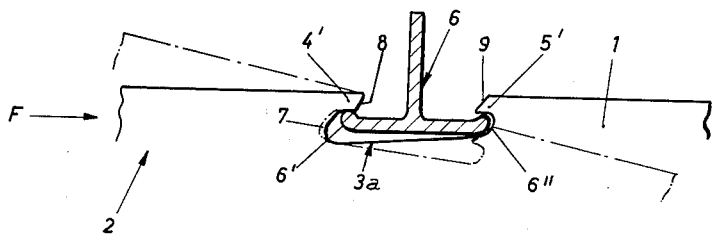
FIGURE 2 is a view similar to FIGURE 1 showing a first embodiment of a suspension fitting according to the invention.

FIGURE 2 illustrates a file 2 equipped with a suspension fitting according to the invention. The fitting has noses 4' and 5', which extend toward each other from the opposite sides of the recess 3a at the top thereof. In addition, the recess 3a is laterally enlarged on one side thereof which makes possible a shifting and tilting of file 2 transversely to carriage track 6. However, the free ends of the two noses 4' and 5' have end edges 8 and 9 which are inclined at approximately the same angle to the upper edge of the file. The edge 8 of nose 4' adjacent to the access side forms an acute angle with the suspension edge 1. In FIGURE 2, the file 2 is shown in broken lines in a tilted position. Here too, as in FIGURE 1, nose 5' supports itself against the lower side of edge 6" of track 6, while nose 4' is pushed against edge 6' of track 6. The broken line position of the file 2 in FIGURE 2, as compared to the position of the file in FIGURE 1, is considerably less slanted. In actual practice it has been shown that in this manner, the amount of inclination of the file can be reduced by more than half. The suspension fitting can be constructed as a metal part which is attached to the edge of a file container, but it can also be provided by appropriate shaping of the suspension edge of the file. It is also possible to construct the fitting as part of a strap 15 of plastic etc., as shown in FIGURE 5. The suspension fitting can also be a separate part which is subsequently attached to file containers or record envelopes.

In the embodiment according to FIGURE 2, the width, that is, the distance between the upper and lower edges, of the noses 4' and 5' is somewhat smaller than in the known device shown in FIGURE 1. This is possible when the suspension fitting consists, for example, of metal or plastic. Through the reduction of the thickness of noses 4' and 5' the extent of the necessary slant for removing the file 2 from the suspension track 6 is further reduced somewhat.

Figure 3:
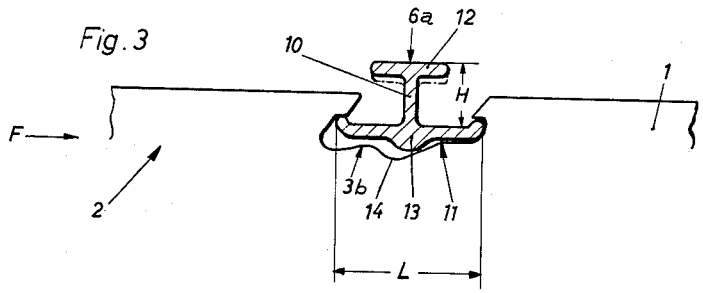
FIGURE 3 is a similar view showing a modification.

In the case of suspension file systems for suspension files with a series of suspension tracks arranged above each other at selected intervals (FIGURE 4), the distance from suspension track 6 to suspension track 6 must be kept as small as possible in order to make full use of the room in the filing cabinet. Because of the reduction of the tilted position of the suspension files when attaching and removing them from the suspension track 6, this distance between the suspension tracks can be considerably reduced. However, there will be the difficulty that upon removing the file 2 while it is in the slanted position the lower corner of suspension file 2 hits the upper edge of the suspension track 6 immediately below. FIGURE 3 shows a suspension fitting which also permits the use of smaller distances from track to track without any danger of collision in removing and attaching the files. This is brought about by having the ratio of the height H of the stem 10 of the suspension track 6a to the length L of cross bar 11 of suspension track 6a be smaller than about 0.5. In order to provide a sufficient bending strength of suspension track 6a, said track 6a, as shown in FIGURE 3, is constructed in cross section as having a double-T-profile. The second cross bar 12 may be thicker than bridge 10 and cross bar 11.

Carriage 6a, in the example according to FIGURE 3, has on the underside of cross bar 11 below stem 10 a protrusion 13 which prevents an undesirable slanted position of the file 2 when said file is unbalanced for the reasons discussed in my copending application Serial No. 23,195. In order that protrusion 13 will not interfere with the handling of the file in the process of removing and attaching, recess 3b is provided with an enlarged part 14 in its lower edge.

However, other forms of recesses can be chosen without going outside the scope of the invention. It is, for instance, possible to have a symmetrical recess. It is important, however, that the recess leaves enough clearance so that there is sufficient room for shifting and tilting when the file 2 is to be attached or removed.

Figure 4:
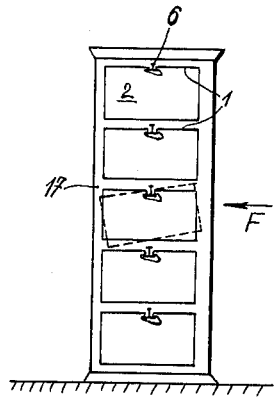
FIGURE 4 is a front view of a filing cabinet with five suspension file, suspension tracks therein arranged above each other.

FIGURE 4 shows a filing cabinet 17 equipped with five suspension tracks 6. On the center suspension track can be seen in broken lines a suspension file in the slanted position in which it can be removed from the suspension track. This example shows especially clearly that the extent of the necessary tilting determines the distance from track to track and the size of the cabinet.

Similarly it can be seen from FIGURE 5 how the device works. This figure shows a cabinet (with the side wall removed) for the filing of large size drawings, blueprints, etc.

If in these cases a known suspension device according to FIGURE 1 were used, drawing 16 would have to be considerably more slanted. To make this possible, the cabinet would have to be considerably higher. The new suspension device, on the other hand, permits a considerable saving of space.

Although particular preferred embodiments of the invention have been disclosed above for illustrative purposes, it will be understood that variations or modifications of such disclosures, which lie within the scope of the appended claims, are fully contemplated.

What is claimed is:

1. In a suspension-type filing device, comprising an elongated and rigid supporting track of uniform cross section having two parallel flange means extending along the opposite lengthwise sides thereof and projecting in opposite sideward directions therefrom; a filing container fabricated of sheet material and having an upper suspension edge portion; suspension means on said suspension edge portion, said suspension means having a recess opening through the upper edge thereof, said recess being defined by a bottom edge, a pair of spaced side edges and a pair of carrier noses extending toward each other from the upper ends of said side edges, the distance between the carrier noses being less than the distance between the remote edges of said flange means, said recess being laterally and downwardly enlarged below at least one of said noses, so that the track can be moved transversely within said recess and so that the filing container can be tilted with respect to said track in order that said track can be moved clear of the other said noses; the improvement in means permitting said track to clear said other nose when said filing container is tilted at a small angle to said track which comprises a pair of substantially upright end edges on the free ends of said noses, the end edge of said other nose being flat and forming an obtuse angle with said upper suspension edge portion, so that, when said other nose is disposed below its associated track flange means and said one nose is disposed above its associated track flange means, a point on the end edge of said other nose between the upper and lower ends of said end edge can bear on the bottom of said track to minimize the inclination of said filing container with respect to said flanges.

2. A suspension device according to claim 1, wherein the distance between a portion of the side edge beneath said one nose and the end edge of said other nose is greater than the distance between said remote edges of said flanges so that, when the edge of one flange is against said portion of said one side of said recess, said other nose can clear the edge of the other flange with a minimum of downward movement of said other nose from a position wherein sideward movement of said other nose toward said track will cause said noses to extend over and be respectively supported upon said flange means.

References Cited by the Examiner

UNITED STATES PATENTS

| 1,066,543 | 7/13 | Stillwell | 129—16 |
| 2,223,978 | 12/40 | Dew | 129—16 |
| 2,483,046 | 9/49 | Heckert | 312—184 X |

FOREIGN PATENTS

| 562,574 | 6/60 | Belgium. |
| 751,152 | 6/56 | Great Britain. |

FRANK B. SHERRY, *Primary Examiner.*

CHANCELLOR E. HARRIS, *Examiner.*